(12) United States Patent
Rached

(10) Patent No.: US 9,279,074 B2
(45) Date of Patent: Mar. 8, 2016

(54) HEAT TRANSFER PROCESS

(75) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 533 days.

(21) Appl. No.: 13/386,719

(22) PCT Filed: Jun. 23, 2010

(86) PCT No.: PCT/FR2010/051283
§ 371 (c)(1),
(2), (4) Date: Jan. 24, 2012

(87) PCT Pub. No.: WO2011/015738
PCT Pub. Date: Feb. 10, 2011

(65) Prior Publication Data
US 2012/0117991 A1 May 17, 2012

(30) Foreign Application Priority Data

Jul. 28, 2009 (FR) ..................................... 09 55267

(51) Int. Cl.
*C09K 5/04* (2006.01)
*C10M 171/00* (2006.01)

(52) U.S. Cl.
CPC ............ *C09K 5/045* (2013.01); *C10M 171/008* (2013.01); *C09K 2205/106* (2013.01); *C09K 2205/11* (2013.01); *C09K 2205/112* (2013.01); *C09K 2205/12* (2013.01); *C09K 2205/122* (2013.01); *C09K 2205/126* (2013.01); *C10M 2207/2835* (2013.01); *C10M 2209/043* (2013.01); *C10M 2209/1033* (2013.01); *C10N 2220/30* (2013.01); *C10N 2220/301* (2013.01); *C10N 2220/302* (2013.01); *C10N 2220/303* (2013.01); *C10N 2220/306* (2013.01)

(58) Field of Classification Search
CPC ............................................... C09K 2205/126
USPC ......................................................... 252/67
See application file for complete search history.

(56) References Cited

U.S. PATENT DOCUMENTS

| 4,227,645 | A | 10/1980 | de La Farge et al. | |
|---|---|---|---|---|
| 4,465,609 | A | 8/1984 | Denis et al. | |
| 4,948,526 | A | 8/1990 | Fellows et al. | |
| 6,814,884 | B2 | 11/2004 | Jannick et al. | |
| 6,913,076 | B1 | 7/2005 | Hays | |
| 2005/0188697 | A1 | 9/2005 | Zvhowski et al. | |
| 2006/0010872 | A1 | 1/2006 | Singh et al. | |
| 2006/0242985 | A1* | 11/2006 | Leck et al. | 62/323.1 |
| 2007/0007488 | A1 | 1/2007 | Singh et al. | |
| 2008/0314073 | A1* | 12/2008 | Minor | 62/498 |
| 2009/0049856 | A1 | 2/2009 | Sun | |
| 2009/0095014 | A1 | 4/2009 | Sun et al. | |
| 2010/0139274 | A1* | 6/2010 | Zyhowski et al. | 60/651 |
| 2010/0154419 | A1* | 6/2010 | Kontomaris | 60/645 |
| 2011/0144216 | A1* | 6/2011 | Hulse et al. | 514/757 |
| 2012/0004299 | A1* | 1/2012 | Hulse et al. | 514/475 |
| 2012/0117990 | A1 | 5/2012 | Rached et al. | |
| 2013/0255284 | A1 | 10/2013 | Rached | |

FOREIGN PATENT DOCUMENTS

| JP | 4-110388 | 4/1992 |
|---|---|---|
| JP | 2008-524433 A | 7/2008 |
| JP | 2008-531975 A | 8/2008 |
| JP | 2009-523859 A | 6/2009 |
| WO | WO 02/40613 A1 | 5/2002 |
| WO | WO 2004/037913 A2 | 5/2004 |
| WO | WO 2004/037913 A3 | 5/2004 |
| WO | WO 2005/085398 A2 | 9/2005 |
| WO | WO 2005/085398 A3 | 9/2005 |
| WO | WO 2006/069362 A2 | 6/2006 |
| WO | WO 2006/069362 A3 | 6/2006 |
| WO | WO 2006/094304 A2 | 9/2006 |
| WO | WO 2006/094304 A3 | 9/2006 |
| WO | WO 2006/113902 A2 | 10/2006 |
| WO | WO 2006/113902 A3 | 10/2006 |
| WO | WO 2007/002625 A2 | 1/2007 |
| WO | WO 2007/053697 A2 | 5/2007 |
| WO | WO 2007/082046 A1 | 7/2007 |
| WO | WO 2008/134061 A2 | 11/2008 |
| WO | WO 2008/157757 A1 | 12/2008 |

OTHER PUBLICATIONS

XP-002572845 Organic Rankine Cycle—Wikipedia.
XP-002572844 Rankine Cycle—Wikipedia.
XP-002572843 Technological and Economical Survey of Organic Rankine Cycle Systems—Sylvain Quoilin and Vincent Lemort—Thermodynamics Laboratory.
International Search Report issued in PCT/FR2010/051283, mailed Nov. 17, 2010, 6 pages, European Patent Office, Rijswijk, NL (English/French Language versions).
Haaf, Siegfried, et al., "Refrigeration technology" in *Ullmann's Encyclopedia of Industrial Chemistry*, Jul. 15, 2000, pp. 38-39, John Wiley & Sons, Inc., XP002572156.

\* cited by examiner

*Primary Examiner* — John Hardee
(74) *Attorney, Agent, or Firm* — Buchanan Ingersoll & Rooney P.C.

(57) ABSTRACT

The present invention relates to the use of a refrigerant in organic Rankine cycle systems comprising at least one hydrofluoroolefin, having at least four carbon atoms represented by the formula (I) $R^1CH=CHR^2$ in which $R^1$ and $R^2$ independently represent alkyl groups having from 1 to 6 carbon atoms, substituted with at least one fluorine atom, optionally with at least one chlorine atom.

12 Claims, No Drawings

HEAT TRANSFER PROCESS

FIELD OF THE INVENTION

The present invention relates to a process for energy conversion by means of a composition containing hydrofluoroolefins. It relates more particularly to the use of a composition containing hydrofluoroolefins in organic Rankine cycle systems.

BACKGROUND OF THE INVENTION

With the constant increase in energy prices, there is a growing need to optimize energy usage and recovery. Moreover, campaigns for increasing awareness of the need to reduce carbon dioxide emissions show the importance of energy recovery.

The principle of energy recovery is conversion of unused energy into electricity. The expansion of a fluid such as gas transforms kinetic energy into mechanical energy. Thus, turbines produce electricity by utilizing the phenomenon of expansion to drive a wheel and produce electricity.

The Rankine cycle constitutes the elementary cycle at an industrial level for producing energy from liquid water/steam. It is composed of the following phases: (i) heating, (ii) evaporation at constant temperature until saturation is attained, (iii) isentropic expansion (ideal case), (iv) condensation at constant temperature and (v) isentropic compression.

The Rankine cycle can be applied to other thermodynamic systems, in particular using fluids other than steam. Organic Rankine cycles make it possible to exploit the properties of these other fluids.

The problems posed by substances depleting the ozone layer of the atmosphere (having ozone depletion potential, ODP) were discussed in Montreal, where the protocol was signed requiring a reduction of the production and use of chlorofluorocarbons (CFCs). Amendments have been made to this protocol, requiring abandonment of CFCs and extending the controls to other products.

Hydrofluorocarbons (HFCs) have replaced CFCs and/or hydrochlorofluorocarbons (HCFCs).

Thus, 1,1,3,3,3-pentafluoropropane (HFC-245fa) has been proposed as fluid for organic Rankine cycle systems in which HFC-245fa is heated at a temperature between 140° F. and 300° F. (60 and 149° C.) (WO 2006/113902).

Document WO 2005/085398 discloses the use of polyfluorinated ethers and polyfluorinated ketones as fluid for converting thermal energy to mechanical energy, in particular for organic Rankine cycle systems, at the critical temperature or above the critical temperature of HFC-245fa (154° C.).

The problem encountered with these polyfluorinated ethers or ketones is the low pressure at the condenser, thus promoting infiltration of air into the installations. The presence of moisture and oxygen in the installations leads to corrosion and to destruction of the mechanical parts.

DETAILED DESCRIPTION OF THE INVENTION

The applicant has now discovered that compositions containing hydrofluoroolefins are quite particularly suitable as fluid for energy conversion in organic Rankine cycle systems, especially systems operating at low temperature between 60 and 150° C. Moreover, these compositions have a negligible ODP and a GWP (Global Warming Potential) less than that of the existing fluids. These mixtures also have critical temperatures above 150° C., and can therefore be used at higher temperatures in organic Rankine cycle systems.

A fluid's contribution to the greenhouse effect is quantified by a criterion, GWP, which summarizes the warming effect, taking a reference value of 1 for carbon dioxide.

Organic Rankine cycle systems operate with fluids called refrigerants in one or more stages.

The present invention relates to an energy conversion process using a turbine system having at least one stage comprising successively a step of evaporation of a refrigerant, an expansion step in a turbine, a step of desuperheating in an internal exchanger, a step of condensation of said fluid and a step of liquid compression in a pump, characterized in that the refrigerant comprises at least one hydrofluoroolefin, having at least 4 carbon atoms represented by the formula (I) $R^1CH=CHR^2$ in which $R^1$ and $R^2$ represent, independently, alkyl groups having from 1 to 6 carbon atoms, substituted with at least one fluorine atom, optionally with at least one chlorine atom.

Preferably, at least one alkyl group of the hydrofluoroolefin is completely substituted with fluorine atoms.

Preferably, the temperature of condensation of the refrigerant is greater than or equal to the ambient temperature of the air or else of a natural cold source (lake or flow of water), normally between −40° C. and 50° C. depending on the seasons and the geographical location.

Preferably, the temperature of evaporation of the refrigerant is between 60 and 150° C., and advantageously between 80° C. and 150° C.

As hydrofluoroolefins of formula (I) that are particularly advantageous, we may notably mention 1,1,1,4,4,4-hexafluorobut-2-ene, 1,1,1,4,4,5,5,5-octafluoropent-2-ene, 1,1,1,4-tetrafluorobut-2-ene, 1,1,1,4,4-pentafluorobut-2-ene, 1,4,4-trifluorobut-2-ene, 1,1,1-trifluorobut-2-ene, 4-chloro-1,1,1-trifluorobut-2-ene, 4-chloro-4,4-difluorobut-2-ene.

The preferred hydrofluoroolefins of formula (I) can be in the cis or trans form or mixture of the two.

Besides the hydrofluoroolefin(s) of formula (I), the refrigerant can comprise at least one compound selected from hydrofluorocarbons, hydrocarbons, (hydro)fluoroethers, hydrochlorofluoropropenes, hydrofluoropropenes, ethers, alcohols, methyl formate, carbon dioxide and trans-1,2-dichloroethylene.

As hydrofluorocarbons, we may notably mention 1,1,1,3,3-pentafluorobutane, 1,1,1,2-tetrafluoroethane, pentafluoroethane, 1,1,1,3,3-pentafluoropropane, 1,1,1,2,3-pentafluoropropane, 1,1,1,2,2-pentafluoropropane, 1,1,1,3,3,3-hexafluoropropane, 1,1,2,2,3-pentafluoropropane, 1,1,1,3,3-pentafluorobutane, 1,1,1,2,2,3,4,5,5,5-decafluoropentane and 1,1,1,2,3,3,3-heptafluoropropane.

Hydrocarbons having at least three carbon atoms are preferred. Hydrocarbons with five carbon atoms such as pentane, isopentane, cyclopentane are particularly preferred.

The preferred hydrochlorofluoropropenes are 2-chloro-3,3,3-trifluoroprop-1-ene and 1-chloro-3,3,3-trifluoroprop-1-ene, in particular trans-1-chloro-3,3,3-trifluoroprop-1-ene.

The preferred hydrofluoroethers are those having from three to six carbon atoms.

As hydrofluoroethers, we may notably mention heptafluoromethoxypropane, nonafluoromethoxybutane and nonafluoroethoxybutane. The hydrofluoroether is available in several isomeric forms such as 1,1,1,2,2,3,3,4,4-nonafluoroethoxybutane, 1,1,1,2,3,3-hexafluoro-2-(trifluoromethyl)-3-ethoxybutane, 1,1,1,2,2,3,3,4,4-nonafluoro-methoxy butane, 1,1,1,2,3,3-hexafluoro-2-(trifluoromethyl)-3-methoxybutane, and 1,1,1,2,2,3,3-heptafluoromethoxypropane.

The preferred hydrofluoropropenes are trifluoropropenes such as 1,1,1-trifluoropropene, tetrafluoropropenes such as 2,3,3,3-tetrafluoropropene (HFO-1234yf), and 1,3,3,3-tetrafluoropropene (cis and/or trans).

The ethers can be selected from dimethyl ether, diethyl ether, dimethoxymethane or dipropoxymethane.

The alcohols can be selected from ethanol, isopropanol, butanol and isobutanol.

Preferably, the refrigerant comprises at least one hydrofluoroolefin of formula (I) and at least one hydrofluorocarbon. The hydrofluorocarbon is advantageously selected from 1,1,1,3,3-pentafluorobutane and 1,1,1,3,3-pentafluoropropane.

Azeotropic compositions of 1,1,1,4,4,4-hexafluorobut-2-ene or of 1,1,1,4,4,5,5,5-octafluoro-pent-2-ene with methyl formate, pentane, isopentane, cyclopentane or trans-1,2-dichloroethylene may also be suitable.

Preferably, the refrigerant comprises at least 10 wt. % of hydrofluoroolefins of formula (I).

According to one embodiment of the invention, the refrigerant comprises from 40 to 100 wt. % of 1,1,1,4,4,4-hexafluorobut-2-ene and from 0 to 60 wt. % of at least one compound selected from pentane, isopentane, cyclopentane and trans-1,2-dichloroethylene.

As refrigerants that are particularly preferred, we may mention those comprising from 60 to 100 wt. % of 1,1,1,4,4,4-hexafluorobut-2-ene and from 0 to 40 wt. % of cyclopentane, pentane, isopentane or trans-1,2-dichloroethylene.

The refrigerant used in the present invention can comprise a stabilizer of the hydrofluoroolefin. The stabilizer represents at most 5 wt. % relative to the total composition of the fluid.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-ter-butyl-4-methylphenol, epoxides (alkyl optionally fluorinated or perfluorinated or alkenyl or aromatic) such as n-butyl glycidyl ether, hexanediol diglycidyl ether, allyl glycidyl ether, butylphenylglycidyl ether, phosphites, phosphates, phosphonates, thiols and lactones.

The refrigerant used in the process according to the present invention can comprise lubricants such as mineral oil, alkylbenzene, polyalfaolefin, polyalkylene glycol, polyol ester and polyvinyl ether. The lubricants used with the refrigerant can comprise nanoparticles for improving the thermal conductivity of the fluid as well as its compatibility with the lubricants. As nanoparticles, we may notably mention particles of $Al_2O_3$ or of $TiO_2$.

The lubricants used with the refrigerant can comprise dehumidifying agents of the zeolite type. The zeolites absorb water, which prevents corrosion and deterioration of performance.

EXPERIMENTAL SECTION

Evap: evaporator,
Cond: condenser,
Temp: temperature,
P: pressure,
Efficiency: this is the ratio of the power supplied by the turbine to the useful high-temperature power supplied to the system.

The performance of the refrigerant in the operating conditions in an energy conversion cycle with temperature at the evaporator maintained at 11.7° C. and at the condenser at 149° C. are given below.

Isentropic efficiency of the turbine: 100%
C: Isopentane
D: TDCE
F: pentane
G: 1,1,1,4,4,4-hexafluorobut-2-ene
PFE-PFIPK (perfluoroethyl perfluoroisopropyl ketone)
MPFBE (methyl perfluorobutyl ether)

| | | Temp cond inlet (° C.) | Temp cond outlet (° C.) | Temp pump outlet (° C.) | Temp evap inlet (° C.) | Temp turbine inlet (° C.) | Temp turbine outlet (° C.) | evap P (bar) | cond P (bar) | Lapse | isentropic efficiency | % Power supplied | Efficiency, % |
|---|---|---|---|---|---|---|---|---|---|---|---|---|---|
| | 245fa | 11.7 | 11.7 | 12.7 | 149 | 149 | 25.7 | 33.5 | 0.86 | 0.00 | 1.00 | 100 | 100 |
| | PFE-PFIPK | 11.7 | 11.7 | | 149 | 149 | | 12.9 | 0.29 | 0.000 | 1.0 | 149 | 95 |
| | MPFBE | 11.7 | 11.7 | | 149 | 149 | | 8.7 | 0.14 | 0.000 | 1.0 | 164 | 102 |
| | G | 11.7 | 11.7 | 12.1 | 149 | 149 | 54.2 | 19.7 | 0.42 | 0.00 | 1.00 | 98 | 107 |
| F | G | | | | | | | | | | | | |
| 20 | 80 | 14.3 | 11.7 | 12.2 | 149 | 149 | 57.2 | 21.6 | 0.67 | -2.61 | 1.00 | 110 | 107 |
| 30 | 70 | 11.7 | 11.7 | 12.2 | 149 | 149 | 57.3 | 21.5 | 0.68 | -0.01 | 1.00 | 121 | 110 |
| 40 | 60 | 14.1 | 11.7 | 12.2 | 149 | 150 | 58.7 | 21.0 | 0.67 | -2.39 | 1.00 | 132 | 109 |
| 50 | 50 | 16.5 | 11.7 | 12.2 | 149 | 151 | 60.6 | 20.3 | 0.67 | -4.81 | 1.00 | 144 | 109 |
| C | G | | | | | | | | | | | | |
| 20 | 80 | 17.2 | 11.7 | 12.3 | 149 | 149 | 57.4 | 23.0 | 0.78 | -5.50 | 1.00 | 106 | 104 |
| 30 | 70 | 13.8 | 11.7 | 12.3 | 149 | 149 | 56.3 | 23.3 | 0.79 | -2.05 | 1.00 | 116 | 107 |
| 40 | 60 | 11.8 | 11.7 | 12.3 | 149 | 149 | 56.9 | 23.0 | 0.79 | -0.05 | 1.00 | 127 | 110 |
| 50 | 50 | 13.4 | 11.7 | 12.3 | 149 | 150 | 58.5 | 22.5 | 0.79 | -1.70 | 1.00 | 138 | 110 |
| 60 | 40 | 15.0 | 11.7 | 12.3 | 149 | 151 | 59.9 | 21.8 | 0.78 | -3.29 | 1.00 | 149 | 109 |
| D | G | | | | | | | | | | | | |
| 10 | 90 | 13.4 | 11.7 | 12.1 | 149 | 149 | 50.7 | 20.1 | 0.51 | -1.70 | 1.00 | 100 | 107 |
| 15 | 85 | 12.9 | 11.7 | 12.1 | 149 | 149 | 48.0 | 20.2 | 0.52 | -1.19 | 1.00 | 102 | 107 |
| 20 | 80 | 12.2 | 11.7 | 12.1 | 149 | 149 | 44.9 | 20.2 | 0.53 | -0.50 | 1.00 | 105 | 108 |
| 30 | 70 | 12.6 | 11.7 | 12.1 | 149 | 150 | 39.4 | 19.9 | 0.53 | -0.89 | 1.00 | 110 | 108 |
| 40 | 60 | 16.2 | 11.7 | 12.1 | 149 | 152 | 35.1 | 19.4 | 0.53 | -4.46 | 1.00 | 116 | 107 |

The results show the low pressure at the condenser for the two products PEE-PFIPK and MPFBE, which promotes infiltration of air into the installations.

The invention claimed is:

1. An energy conversion process employing a turbine system having at least one stage comprising successively:
   evaporating a refrigerant;
   expanding said refrigerant in a turbine;
   desuperheating said refrigerant in an internal exchanger;
   condensing said refrigerant; and
   compressing said refrigerant in a pump, wherein
  the energy conversion process is an organic Rankine cycle;
  the refrigerant comprises at least one hydrofluoroolefin having at least 4 carbon atoms represented by the formula $R^1CH=CHR^2$ in which $R^1$ and $R^2$ represent, independently, alkyl groups having from 1 to 6 carbon atoms, substituted with at least one fluorine atom, optionally substituted with at least one chlorine atom; and
  the evaporation temperature is between 60 and 150° C.

2. The process as claimed in claim 1, wherein the refrigerant further comprises at least one compound selected from the group consisting of hydrofluorocarbons, hydrocarbons, (hydro)fluoroethers, hydrochlorofluoropropenes, hydrofluoropropenes, ethers, methyl formate, carbon dioxide and trans-1,2-dichloroethylene.

3. The process as claimed in claim 1, wherein the refrigerant further comprises at least one hydrofluorocarbon selected from the group consisting of 1,1,3,3,3-pentafluoropropane and 1,1,3,3,3-pentafluorobutane.

4. The process as claimed in claim 1, wherein the refrigerant further comprises at least one hydrocarbon selected from the group consisting of pentane, isopentane and cyclopentane.

5. The process as claimed in claim 1, wherein the refrigerant comprises from 40 to 100 wt. % of 1,1,1,4,4,4-hexafluorobut-2-ene and from 0 to 60 wt. % of at least one compound selected from the group consisting of pentane, isopentane, cyclopentane and trans-1,2-dichloroethylene.

6. The process as claimed in claim 1, wherein the refrigerant comprises from 60 to 100 wt. % of 1,1,1,4,4,4-hexafluorobut-2-ene and from 0 to 40 wt. % of cyclopentane, pentane, isopentane or trans-1,2-dichloroethylene.

7. The process as claimed in claim 1, wherein the refrigerant further comprises a stabilizer.

8. The process as claimed in claim 1, wherein the refrigerant further comprises a lubricant.

9. The process as claimed in claim 8, wherein the lubricant is polyalkylene glycol, polyol ester or polyvinyl ether.

10. The process as claimed in claim 1, wherein the evaporation temperature is between 80 and 150° C.

11. The process as claimed in claim 1, wherein the refrigerant is condensed in a condenser distinct from the internal heat exchanger.

12. The process as claimed in claim 1, wherein the refrigerant is condensed in a condenser distinct from the internal heat exchanger.

* * * * *